April 27, 1943.  C. G. PULLIN  2,317,342
ROTARY WING AIRCRAFT
Filed April 6, 1940  6 Sheets-Sheet 4

Fig. 5.

INVENTOR
Cyril George Pullin
ATTORNEYS

Fig. 6.

Patented Apr. 27, 1943

2,317,342

UNITED STATES PATENT OFFICE 2,317,342

ROTARY WING AIRCRAFT

Cyril George Pullin, Genista, Newton Mearns, Scotland, assignor to Autogiro Company of America, Willow Grove, Pa., a corporation of Delaware Application April 6, 1940, Serial No. 328,232
In Great Britain April 3, 1939

32 Claims. (Cl. 244—17)

The present invention relates to rotary wing aircraft and more particularly to aircraft in which power is supplied at least under certain conditions of flight to a sustaining rotor and also to a propulsive airscrew or airscrews.

Difficulty has been experienced in aircraft having a power driven sustaining rotor due to the torque reaction of the rotor which has usually been counteracted by employing fins or control surfaces disposed in the slipstream either of the rotor or of a propulsive airscrew. It has also been proposed to counteract the rotor torque by the thrust moment of an airscrew offset from the longitudinal axis of the aircraft but this has the disadvantage that manual adjustment of the airscrew thrust was necessary according to the flight conditions of the rotor.

It is an object of this invention to provide a simple mechanism for balancing the thrust moment of a propulsive airscrew against the torque reaction of the rotor under all conditions of flight.

Another object of this invention is to provide a yawing control for the aircraft by altering the amount of the offsetting of the airscrew from the longitudinal axis of the aircraft.

A further object of the invention is to provide improved means for starting the rotor and bringing it up to the speed required for flight.

Still further objects and advantages of the present invention will appear from the following description of one embodiment of the invention, which is illustrated by way of example in the accompanying drawings.

Figure 1:
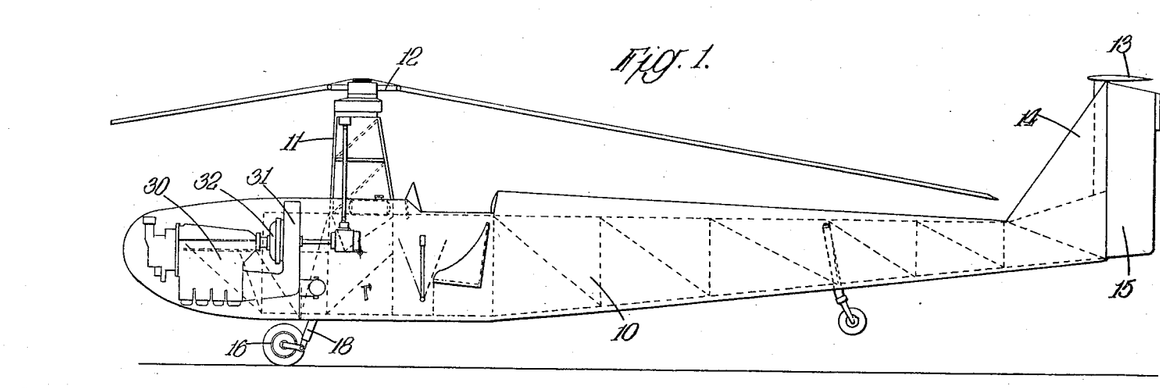
Fig. 1 is an elevational view of a rotative wing aircraft embodying the present invention.
Figure 2:
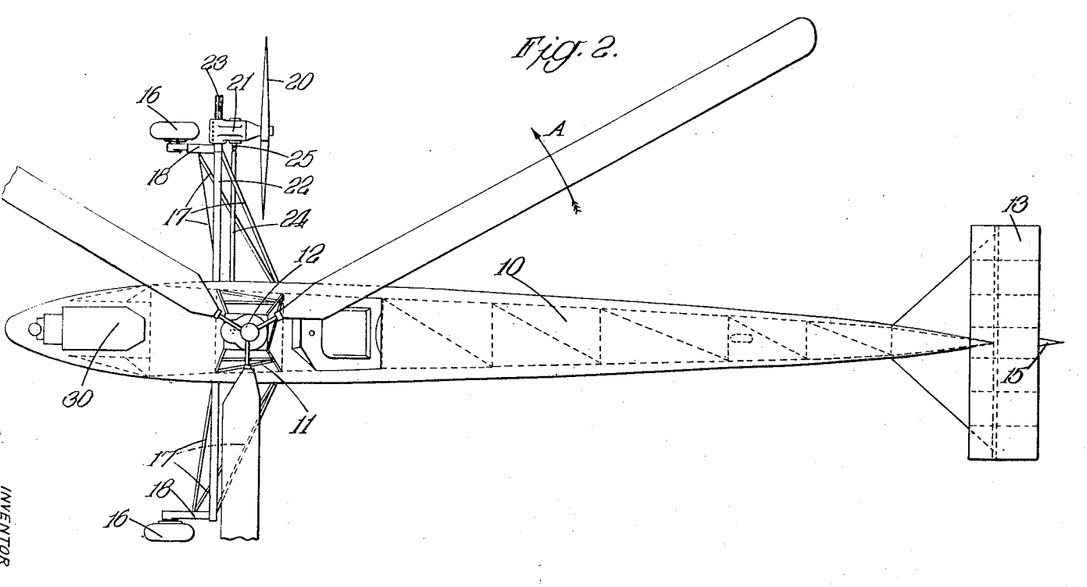
Fig. 2 is a plan view of the same.
Figure 3:
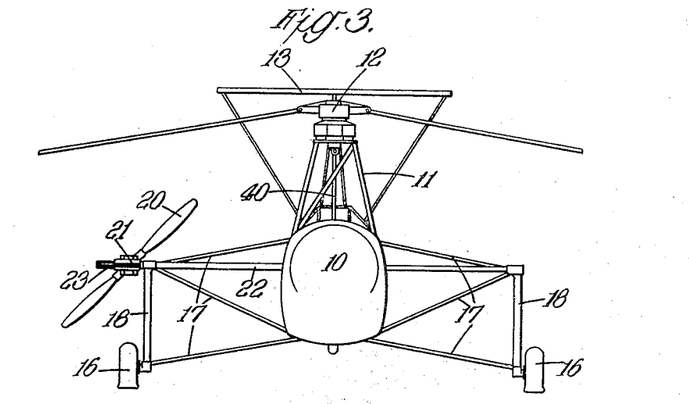
Fig. 3 is a front elevation of the aircraft.

Referring to the drawings: A rotative wing aircraft has a fuselage 10, with a pylon structure 11 carrying a rotor 12 turning in the direction of the arrow A (Fig. 2). An elevator 13 is carried on a vertical fin 14 which also carries a rudder 15. These control surfaces are mounted outside the slipstream of the rotor and are little affected by the slipstream of the airscrew 20. The aircraft has an undercarriage comprising landing wheels 16 each carried on an outrigger structure 17 which includes a shock absorbing strut 18.

The outrigger structure on the starboard side of the aircraft carries an airscrew 20 which, as will be seen from Figs. 2 and 3, is offset some distance from the longitudinal axis of the aircraft. The airscrew 20 is driven through a gear box 21 from a shaft 22 having a splined part 23 at its outer end which permits a certain amount of alteration of the amount of offset of the airscrew 20 from the longitudinal axis of the aircraft. A link 24 attached by an universal joint 25 to the gear box 21 is coupled to a pilot's control as described hereafter and by which the offset of the airscrew may be altered.

Figure 4:
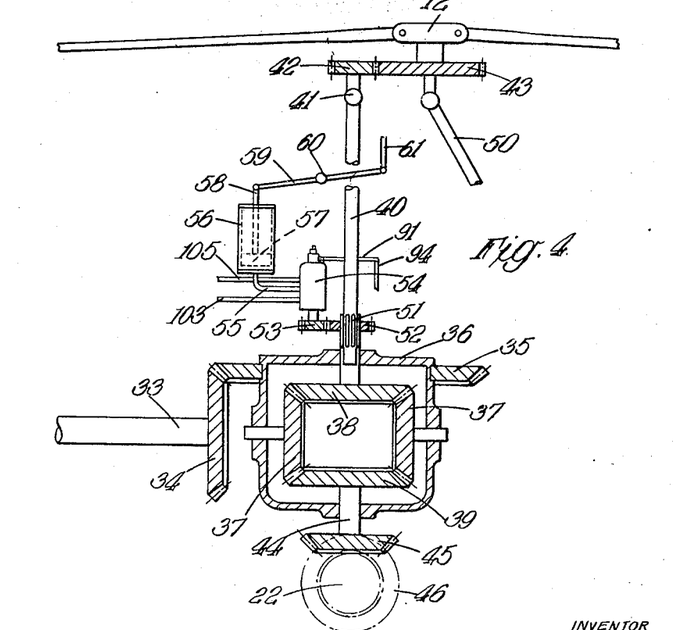
Fig. 4 is a somewhat diagrammatic sectional elevation of the rotor and airscrew drive means.
Figure 5:
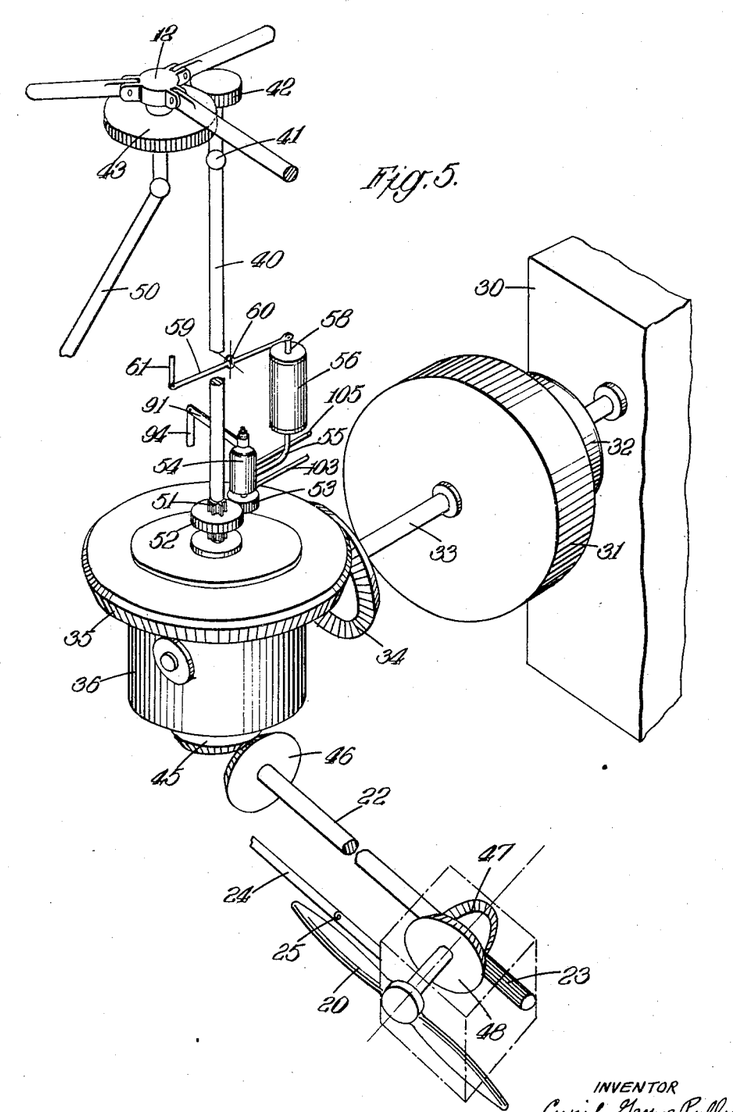
Fig. 5 is a diagrammatic perspective view of said drive means.

Reference will now be made to Figs. 4 and 5 which show the transmission means between a power unit 30 mounted in the nose of the aircraft and which supplies the power for driving the rotor 12 and also the airscrew 20. Mounted on the power unit shaft is a cooling fan 31 and a primary clutch 32 which may be of any suitable type. From the primary clutch 32 and cooling fan 31 a shaft 33 extends rearwardly to a bevel wheel 34 meshing with a crown wheel 35 secured to the casing 36 of a differential balance gear. Mounted within the casing 36 are a pair of idler bevel wheels 37 meshing with an upper wheel 38 and a lower wheel 39, the former being coupled by a shaft 40 which extends upwardly within the pylon structure 11 to the rotor 12 which it drives through an universal joint 41 and two pinions 42 and 43. The lower wheel 39 is carried on a stub shaft 44 coupled by a bevel drive 45, 46 to the shaft 22 driving the airscrew through a similar bevel drive 47, 48 within the gear box 21. The arrangement shown is of course purely diagrammatic and the invention must not in any way be considered to be limited to the exact construction shown; for instance any suitable rotor hub structure may be used in place of that illustrated. This hub structure is of the type in which rolling and pitching control of the aircraft is effected by tilting of the real axis of the hub, such movement being permitted by the hub mounting, which is not shown, since it is well known in the art, and being controlled by a dependant column 50 placed in convenient reach of the pilot. It is obvious that the control of the aircraft may alternatively be provided by a hub of the type in which the real axis of the hub is fixed while the lift vector is tilted for control purposes by cyclic change of the blade pitch angles or otherwise. The above-mentioned rotor control arrangements are more fully disclosed in Cierva British Patents 393,976, 410,532 and 452,364, and their corresponding United States patent applications.

It will be seen that the transmission mechanism illustrated in Fig. 4 provides for the splitting of the power unit torque equally between the sustaining rotor and the propulsive airscrew, this balance being maintained during normal flight except insofar as it may be affected by the mechanical imperfection of the differential balance gear and by the inertia of the moving parts. Thus the thrust of the airscrew bears a constant relationship to the torque supplied to the rotor so that the thrust moment of the offsetting airscrew can be arranged to give fairly accurate compensation of the rotor torque.

By varying the extent of the offsetting of the airscrew the thrust moment of the airscrew can be altered so that it is greater than, equal to, or less than the rotor torque reaction, thus providing a sensitive yawing control of the aircraft. As previously mentioned, this movement of the airscrew is provided for by splining at 23 the shaft 22 driving the airscrew and by the link 24 coupled to a pilot's control to move the gear box 21 and airscrew 20 towards or away from the fuselage. For instance the link 24 may be coupled to a rudder bar or analogous pilot's control, being operated either alone or simultaneously with the rudder 15. It is necessary to provide the aircraft with the rudder 15 so that control of the aircraft may be maintained even in the event of failure of the power unit, which would reduce to zero the torque applied to the rotor and to the airscrew.

A feature of this invention consists in providing means for altering the pitch either of the rotor or of the airscrew to maintain constant its rotational speed. In the construction illustrated in Figs. 4 and 5 the rotor drive shaft 40 has a splined part 51 carrying a pinion 52 meshing with a pinion 53 of a governor unit 54 which controls the admission of pressure fluid through a pipe 55 to a relay cylinder 56 having a piston 57 with a rod 58 coupled by a lever 59 pivoted at 60 to a rod 61 which actuates the pitch change means (not illustrated) of the rotor, which pitch change means may take a known form, such as shown in the last two mentioned Cierva British patents.

Figure 6:
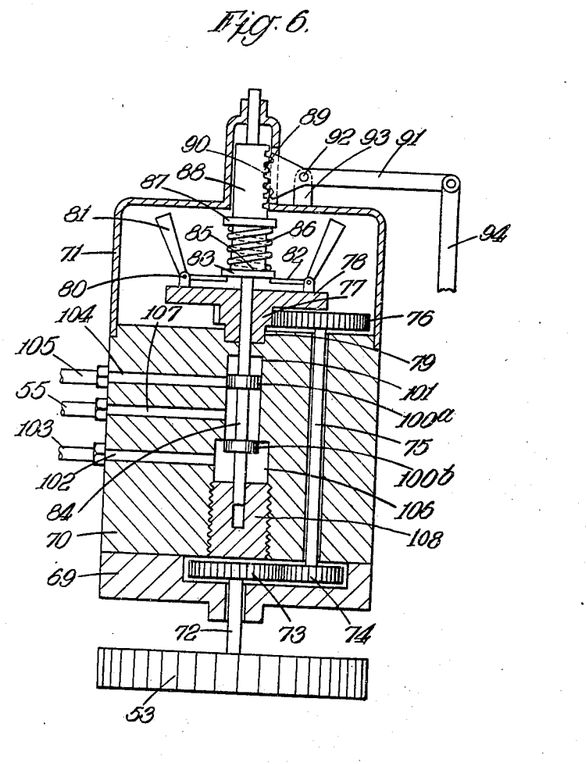
Fig. 6 is a diagrammatic section through the constant speed unit.

The governor unit referred to as 54 is diagrammatically illustrated in Fig. 6 which is a vertical section through the unit. It comprises a lower block 69, 70 and an upper casing part 71. The driving pinion 53 is mounted on a stub shaft 72 journalled in the block 69 and having at its upper end a pinion 73 meshing with a smaller pinion 74 at the lower end of a vertical rod 75 journalled in the block 70. At its upper end the rod 75 carries a gear wheel 76 meshing with a wheel 77 carried on the under surface of a plate 78 journalled at 79 in the block 70.

On its upper surface the plate 78 has lugs 80 on which are pivotally mounted the governor weights 81 having inward extensions 82 which engage the underside of a collar 83 at the upper end of a piston valve rod 84. Above the collar 83 is a spigot 85 to which is secured a coil spring 86 interposed between the collar 83 and a similar collar 87 carried by a member 88 having a rack 89 vertically slidable in an extension of the casing part 71. The vertical position of the rack member 88 can be controlled by a toothed arc 90 which engages the rack 89 and which is mounted on an arm 91 pivoted at 92 to a lug 93 on the casing part 71. At its outer end the arm has a dependant link 94 coupled to a pilot's override control for the governor.

The piston rod 84 extends downward from the collar 83 through the centre of the plate 78, carrying the governor weights 81, into a vertical bore in the block 70. The piston rod 84 carries two pistons 100a and 100b which are slidable in an enlarged part of the vertical bore which forms a cylinder 101. An enlarged recess 106 below the cylinder 101 is connected by a duct 102 to a pipe 103 leading to an oil sump. Near the upper end of the cylinder 101 is a duct 104 leading to a pipe 105 extending to a source of oil pressure such as a pump mounted on the power unit 30. The central part of the cylinder 101 between the pistons 100a and 100b is connected by a duct 107 to the pipe 55 connected to the pitch control cylinder 56. The lower end of the piston rod 84 is slidable in a bush 108 screwed into the block 70.

The operation of the governor unit is as follows: The plate 78 carrying the governor weights 81 is driven by the wheels 77, 76, rod 75, pinions 74, 73, stub shaft 72 and pinion 53 from the pinion 52 mounted on the splines 51 of the rotor shaft at a speed proportional to the rotor speed. Should this speed rise the governor weights 81 will tend to move outward, lifting by means of their extensions 82 the collar 83 against the action of the spring 86, thus lifting the piston rod 84 and uncovering the duct 104. This allows oil under pressure to flow from the oil pressure pipe 105 through the duct 104 and cylinder 101 to the duct 107 and pipe 55 to the pitch control cylinder 56 causing the piston 57 and piston rod 58 to rise. The pitch of the rotor is thereby increased causing it to absorb more power and so to slow down. When the speed of the rotor returns to normal the piston 100a cuts off the supply of oil under pressure from the duct 104. On the other hand if the rotor speed falls the governor weights move inward under the action of the spring 86 allowing the piston rod 84 to move downward to put the enlargement 106 in communication with the duct 107. This allows oil from the pitch control cylinder 56 to pass through the pipe 55, duct 107 and the duct 102 and thence by the pipe 103 to a sump thereby reducing the oil pressure in the pitch control cylinder and allowing the piston 57 to fall, reducing the rotor pitch. The reduction of pitch causes the rotor to absorb less power and to return to normal speed.

The equilibrium speed of the governor unit can be adjusted by altering the initial pressure of the spring 86. When the dependant link 94, coupled to a pilot's control for alteration of the governor equilibrium speed, is moved upward the teeth 90 at the opposite end of the arm 91 engaging the rack 89 cause the rack member 88 to move downward to compress the spring 86, thereby increasing the equilibrium speed of the governor. This control is especially useful during starting when the rotor is to be run at above normal speed in a low pitch position to store kinetic energy for a jump start.

In the event of failure of the power unit the rotor speed will drop causing the governor unit to operate to release oil from the pitch control cylinder thereby reducing the rotor pitch. The minimum pitch of the rotor as determined by the end of the travel of the piston 57 in the cylinder 56 is preferably chosen to be within the autorotational range so that the aircraft can be landed safely.

Figure 7:
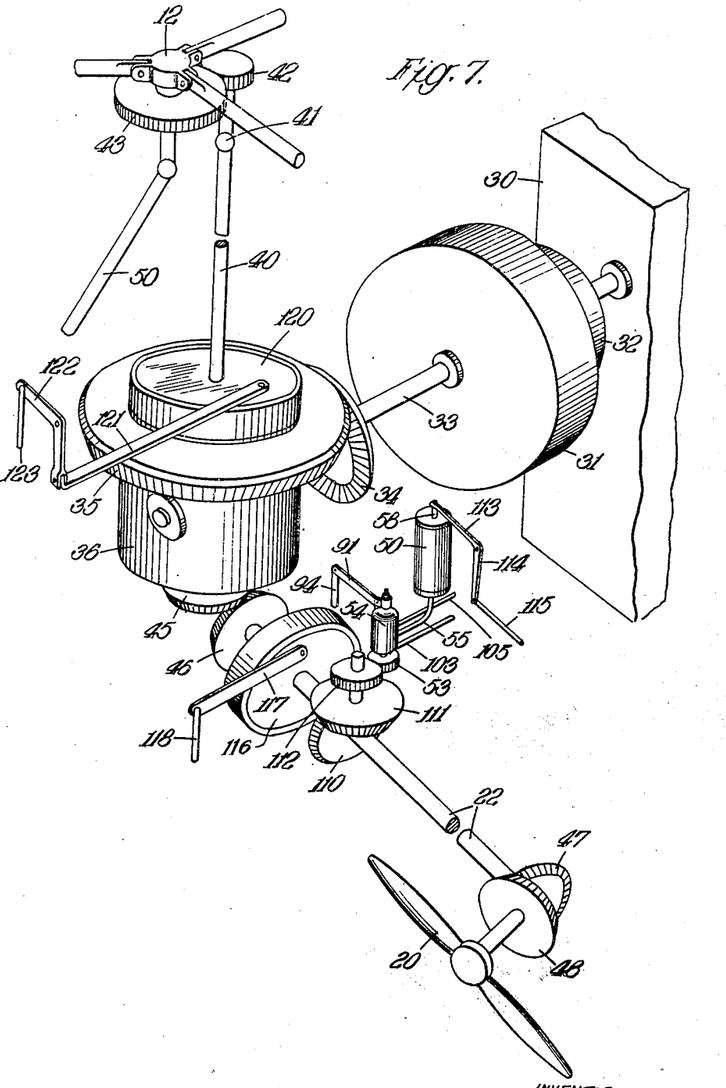
Fig. 7 is a view similar to Fig. 5 but showing an alternative arrangement.

Fig. 7 shows a modified arrangement of the transmission system. The drive from the power unit 30 is transmitted through the primary clutch 32 and shaft 33 to the differential balance gear 36 and thence by the shaft 40 to the rotor 12 and bevel drive 45, 46 and shaft 22 to the bevel drive 47, 48 for the airscrew 20. The general arrangement of the power transmission is similar to that shown in Fig. 5 but the amount of the airscrew offset is constant thus rendering unnecessary the splines 23 on the shaft 22. The constant speed unit 54 instead of being driven from the rotor shaft 40 is driven from the airscrew shaft 22 by bevel wheels 110 and 111 and pinion 112 meshing with the pinion 53 of the unit. The rod 58 of the relay cylinder 56 instead of being coupled to the rotor pitch control is coupled to a pitch control for the airscrew 20 by a bell crank 113 pivoted at 114 and the lower end of which is attached to a rod 115 running to the airscrew pitch change mechanism. The operation is similar to that described with reference to Figs. 4 and 5 except that the airscrew speed and not the rotor speed is maintained constant by alteration of its pitch. Suitable pitch change mechanism for an airscrew is well known in the art and it is therefore not illustrated. As an alternative to the arrangement shown in which the relay cylinder is coupled by a mechanical linkage to the airscrew pitch control, the pipe 55 from the constant speed unit 54 may be connected to an hydraulic pitch control incorporated in the airscrew hub or associated therewith.

The offset of the airscrew from the longitudinal axis of the aircraft is fixed, the amount of the offset being chosen to give fairly accurate compensation for the rotor torque in normal flight. A yawing control is provided by upsetting the division of torque from the power unit between the rotor and airscrew. For this purpose a brake drum 116 is mounted on the airscrew shaft 22 and is actuated by an arm 117 coupled by a rod 118 to the rudder bar or an analogous pilot's control. A brake drum 120 is mounted on the rotor drive shaft 40 and has an arm 121 coupled by a bell crank 122 and rod 123 to the rudder bar or other pilot's control. The rudder bar is arranged to apply the brakes 116 and 120 differentially. Normally when the torque is to be divided in a predetermined ratio say 1:1 between the rotor and airscrew both brakes are "off." When it is desired to cause yawing one of the brakes is applied to cause unbalance of the rotor torque and the airscrew thrust moment, for instance when it is desired to turn to the right the brake 116 is applied, reducing the airscrew thrust. When it is desired to turn to the left the brake 120 is applied causing the torque applied to the rotor to be reduced thus allowing the airscrew thrust moment to exceed the rotor torque reaction.

The rudder bar may also be coupled to the rudder 15 so that control of the aircraft can be maintained during flight as a gyroplane should the power unit fail. It is desirable that means should be provided for preventing the application of the brake 120 under such conditions.

The transmission system may be used to ensure progressive and smooth introduction of the starting torque to the sustaining rotor provided the airscrew has a smaller moment of inertia and runs at a higher speed than the rotor as will normally be the case. When starting, the rotor blades are set in a low pitch angle position, preferably in the zero lift position, and the primary clutch 32 is engaged. Owing to the lower moment of inertia of the airscrew it will speed up more rapidly than the rotor, this action being permitted by the differential balance gear. When the airscrew is revolving at speed, a starting torque approximately equal to the torque absorbed by the airscrew will be reflected through the differential balance gear to the rotor which will be speeded up smoothly.

By operating the airscrew at high speed and/or in a coarse pitch position the rotor can be speeded up to above the normal flight speed to store kinetic energy for a jump start which is attained by a sudden increase of the rotor pitch. To permit of such operation the pilot operates the override control 94 of the constant speed unit 54, which would otherwise cause premature increase of rotor pitch when the normal flight speed of the rotor was reached. The direction of the jump start can be controlled by inclination of the lift line of the rotor so that the rotor thrust assists or counteracts the airscrew thrust.

It is not essential that the transmission mechanism should give equality of the torque applied to the rotor and to the airscrew, it being possible to obtain the desired result according to this invention by dividing the power unit torque between the rotor and the airscrew in any constant proportion, the constructional offset of the airscrew from the longitudinal axis of the aircraft being chosen so that the thrust moment of the airscrew is approximately equal to the rotor torque reaction during normal steady flight. For instance the power unit torque may be divided in the proportion of one third to the airscrew and two-thirds to the rotor, the constructional offset of the airscrew being made greater than in the construction above described in which the applied torque is split equally between the rotor and airscrew to give the requisite airscrew thrust moment.

What I claim is:

1. In an aircraft, rotative sustaining blades which under power impose a reactive torque upon the craft acting about a generally vertical axis, airscrew blades which under power produce a generally horizontal thrust imposing a direct torque upon the craft acting about said vertical axis in a sense opposite to said reactive torque, power means on the craft, and transmission means taking power from the power means and incorporating automatic differentially-acting means through which the power is divided between the sustaining blades and the airscrew blades to effect a substantial balance between said torques under a predetermined flight condition.

2. A construction according to claim 1 having means for relatively adjusting the two torques referred to.

3. A construction according to claim 1 having means for relatively adjusting the two torques referred to, and a rudder for directional control.

4. A construction according to claim 1 having means for relatively adjusting the two torques referred to, a rudder for directional control, and a common control coupled to said adjusting means and said rudder for operating them in conjunction.

5. A construction according to claim 1 having means for relatively adjusting the two torques referred to, comprising means for varying the pitch of the sustaining blades.

6. A construction according to claim 1 having means for relatively adjusting the two torques referred to, comprising means for varying the pitch of the airscrew blades.

7. A construction according to claim 1, wherein the sustaining blades are mounted for pitch variation in a range including and extended above a predetermined autorotational pitch setting, together with mechanism for controlling the mean pitch angle of the sustaining blades, including a device for maintaining a pitch angle higher than said predetermined autorotational setting when said blades are being driven and for decreasing the mean pitch angle to said predetermined autorotational setting when said blades are not being driven.

8. An aircraft including a sustaining rotor generally centralized over the body of the craft, an airscrew arranged to operate on a generally horizontal axis which is offset from the rotor axis so that the airscrew thrust opposes the rotor driving torque reaction on the craft, engine means, and transmission means for delivering power from the engine means to the rotor and to the airscrew, the transmission means incorporating a differential gear system maintaining a substantially constant ratio between the torque applied to the rotor and to the airscrew, the extent of offset of the airscrew axis from the rotor axis and the characteristics of the rotor and airscrew being such that the thrust of the airscrew substantially counteracts the rotor driving torque reaction under a predetermined flight condition.

9. An aircraft in accordance with claim 8, and further incorporating manually operable means for adjusting the degree of effective offset of the airscrew axis.

10. An aircraft in accordance with claim 8, and further incorporating a pilot's control for control of the aircraft in yaw, and mechanism associated with said control for varying the extent of offset of the airscrew axis.

11. An aircraft including a sustaining rotor generally centralized over the body of the craft, a propulsive airscrew arranged with its axis laterally offset from the longitudinal plane of symmetry of the craft at that side thereof on which the rotor blades advance into the flight wind during translational flight, engine means, and transmission means for delivering power from the engine means to the rotor and to the airscrew, the transmission means incorporating a differential gear system maintaining substantial equality of torque applied to the rotor and to the airscrew, the extent of lateral offset of the airscrew axis and the characteristics of the rotor and airscrew being such that the thrust of the airscrew substantially counteracts the rotor driving torque at a predetermined speed of translational flight.

12. An aircraft including a sustaining rotor generally centralized over the body of the craft, a propulsive airscrew arranged with its axis laterally offset from the longitudinal plane of symmetry of the craft at that side thereof on which the rotor blades advance into the flight wind during translational flight, engine means, and transmission means for delivering power from the engine means to the rotor and to the airscrew, the transmission means incorporating a differential gear system maintaining a substantially constant ratio between the torque applied to the rotor and to the airscrew, the extent of lateral offset of the airscrew axis and the characteristics of the rotor and airscrew being such that the thrust of the airscrew substantially counteracts the rotor driving torque at a predetermined speed of translational flight.

13. An aircraft including a sustaining rotor generally centralized over the body of the craft and having blades mounted for pitch variation in a range including and extended above a predetermined autorotational pitch setting, a propulsive airscrew arranged with its axis laterally offset from the longitudinal plane of symmetry of the craft at that side thereof on which the rotor blades advance into the flight wind during translational flight, engine means, disconnectible transmission means for delivering power from the engine means to the rotor and to the airscrew, the transmission means incorporating a differential gear system maintaining a substantially constant ratio between the torque applied to the rotor and to the airscrew, the extent of lateral offset of the airscrew and the characteristics of the rotor and airscrew being such that when the rotor and airscrew are being driven the thrust of the airscrew substantially counteracts the rotor driving torque at the normal cruising speed of translational flight, and mechanism for controlling the mean pitch angle of the rotor blades, including a device for maintaining a pitch angle higher than said predetermined autorotational setting when the rotor is being driven and for decreasing the mean pitch angle to said predetermined autorotational setting when the rotor is not being driven.

14. An aircraft in accordance with claim 13, and further incorporating a pilot's control system including a rudder and common means for adjusting said rudder and adjusting the lateral offset of the airscrew axis.

15. An aircraft including a variable pitch sustaining rotor generally centralized over the body of the craft, a propulsive airscrew arranged with its axis laterally offset from the longitudinal plane of symmetry of the craft at that side thereof on which the rotor blades advance into the flight wind during translational flight, engine means, transmission means for delivering power from the engine means to the rotor and to the airscrew, the transmission means incorporating a differential gear system maintaining a substantially constant ratio between the torque applied to the rotor and to the airscrew, the extent of lateral offset of the airscrew and the characteristics of the rotor and airscrew being such that the thrust of the airscrew substantially counteracts the rotor driving torque at the normal cruising speed of translational flight, and a governor for controlling the mean rotor blade pitch angle, said governor being associated with the rotor drive transmission and providing for increase of the mean pitch angle of the rotor blades upon increase of the rotor R. P. M. above a predetermined speed and for decrease of the mean pitch angle of the rotor blades upon decrease of the rotor R. P. M. below said predetermined speed.

16. An aircraft in accordance with claim 15, and further including means for adjusting the equilibrium speed of the pitch control governor.

17. An aircraft in accordance with claim 15, and further incorporating a manually operable control for increasing or decreasing the mean rotor blade pitch.

18. An aircraft including a sustaining rotor generally centralized over the body of the craft, a variable pitch propulsive airscrew arranged with its axis laterally offset from the longitudinal plane of symmetry of the craft at that side thereof on which the rotor blades advance into the flight wind during translational flight, engine means, transmission means for delivering power from the engine means to the rotor and to the airscrew, the transmission means incorporating a differential gear system maintaining a substantially constant ratio between the torque applied to the rotor and to the airscrew, the extent of lateral offset of the airscrew and the characteristics of the rotor and airscrew being such that the thrust of the airscrew substantially counteracts the rotor driving torque at the normal cruising speed of translational flight, and a governor for controlling the mean airscrew pitch angle, said governor being associated with the airscrew drive transmission and providing for increase of the mean pitch angle of the airscrew blades upon increase of the airscrew R. P. M. above a predetermined speed and for decrease of the mean pitch angle of the airscrew blades upon decrease of the airscrew R. P. M. below said predetermined speed.

19. An aircraft in accordance with claim 18, and further including means for adjusting the equilibrium speed of the pitch control governor.

20. An aircraft in accordance with claim 18, and further incorporating a manually operable control for increasing or decreasing the mean pitch of th airscrew.

21. An aircraft including a power plant, rotative sustaining wing means adapted to be driven during translational flight, a propulsive airscrew, drive mechanism for transmitting power from said power plant to the wing means and to the airscrew, the wing means and the drive mechanism being so arranged that drive thereof sets up a considerable unbalanced reactive torque in the body of the aircraft, said airscrew having its axis disposed generally parallel to the longitudinal axis of the aircraft but offset from said longitudinal axis at that side on which the unbalanced reactive torque acts in a rearward direction during translational flight, said drive mechanism including means for maintaining substantial counterbalancing of the rotor torque reaction by the thrust moment of the offset airscrew.

22. An aircraft including a power plant, rotative sustaining wing means adapted to be driven during translational flight, a propulsive airscrew, drive mechanism for transmitting power from said power plant to the wing means and to the airscrew, the wing means and the drive mechanism being so arranged that drive thereof sets up a considerable unbalanced reactive torque in the body of the aircraft, said airscrew having its axis disposed generally parallel to the longitudinal axis of the aircraft but offset from said longitudinal axis at that side on which the unbalanced reactive torque acts in a rearward direction during translational flight, said drive mechanism including means for dividing the torque from the power plant between the sustaining wings and the airscrew in a uniform ratio at various speeds, the degree of offset of the airscrew axis from the longitudinal axis of the aircraft being such that the torque reaction of the sustaining wings is substantially balanced by the airscrew thrust moment during normal translational flight.

23. In an aircraft, rotative sustaining blades which under power impose a reactive torque upon the craft acting about a generally vertical axis, means of forward propulsion for the craft which under power impose a direct torque upon the craft acting about said axis in a sense opposite to said reactive torque, power means on the craft, and transmission means taking power from the power means and incorporating automatic differentially-acting means through which the power is divided between the sustaining blades and the propulsion means to effect a substantial balance between said torques at various speeds.

24. An aircraft having a sustaining rotor, a power unit, a propulsive airscrew and a power transmission from the power unit to the rotor and to the airscrew including means for dividing the torque from the power unit between the rotor and the airscrew in a uniform ratio at various speeds, the airscrew being offset from the longitudinal axis of the aircraft on the side at which the rotor blades are advancing, by an amount such that the rotor torque reaction is substantially balanced by the airscrew thrust moment during steady flight.

25. An aircraft having a sustaining rotor, a propulsive airscrew, a power unit and a power transmission from the power unit to the rotor and to the airscrew including means for maintaining constant the ratio of the torques applied to the rotor and the airscrew, the airscrew being offset from the longitudinal axis of the aircraft by an amount such that the thrust moment of the airscrew is substantially equal to the rotor torque reaction and a pilot's control for adjusting the offset of the airscrew, said control being coupled to a rudder to provide yawing control of the aircraft.

26. An aircraft having a sustaining rotor, a propulsive airscrew, a power unit and a power transmission from the power unit to the rotor and to the airscrew including means for maintaining constant the ratio of the torques applied to the rotor and the airscrew, the airscrew being offset from the longitudinal axis of the aircraft by an amount such that the thrust moment of the airscrew is substantially equal to the rotor torque reaction and means responsive to the speed of the rotor transmission operatively connected to the rotor blades to produce change of pitch angle to maintain the rotor speed substantially constant at least during normal flight.

27. An aircraft having a sustaining rotor, a propulsive airscrew, a power unit and a power transmission from the power unit to the rotor and to the airscrew including means for maintaining constant the ratio of the torques applied to the rotor and the airscrew, the airscrew being offset from the longitudinal axis of the aircraft by an amount such that the thrust moment of the airscrew is substantially equal to the rotor torque reaction, and a centrifugal governor coupled to a valve for controlling the admission of fluid under pressure to a relay cylinder operatively connected to the rotor blades to produce change of pitch angle in a sense tending to maintain the rotor speed constant during normal flight.

28. An aircraft having a sustaining rotor, a propulsive airscrew, a power unit and a power transmission from the power unit to the rotor and to the airscrew including means for maintaining constant the ratio of torques applied to the rotor and the airscrew, the airscrew being offset from the longitudinal axis of the aircraft by an amount such that the thrust moment of the airscrew is substantially equal to the rotor torque reaction and means responsive to the speed of the airscrew transmission operatively connected to the airscrew blades to produce change of pitch angle to maintain the airscrew speed substantially constant at least during normal flight.

29. An aircraft having a sustaining rotor, a propulsive airscrew, a power unit and a power transmission from the power unit to the rotor and to the airscrew including a balance gear tending to divide the torque from the power unit in a fixed ratio between the rotor and the airscrew, the latter being offset from the longitudinal axis of the aircraft on the side at which the rotor blades are advancing by an amount such that the rotor torque reaction is substantially balanced by the airscrew thrust moment during normal flight in a straight line and brake means for upsetting the torque division to provide a yawing control of the aircraft.

30. An aircraft having a single sustaining rotor, a propulsive airscrew, a power unit and a power transmission from the power unit to the rotor and to the airscrew including a balance gear tending to divide the torque from the power unit in a fixed ratio between the rotor and the airscrew, the latter being offset from the longitudinal axis of the aircraft on the side at which the rotor blades are advancing by an amount such that the rotor torque reaction is substantially balanced by the airscrew thrust moment during normal flight in a straight line, a pilot's rudder bar or analogous control, a rudder coupled thereto, brakes acting on the airscrew and rotor transmissions respectively, and an operative connection between the rudder bar and the brakes for operating the latter selectively to produce unbalance of the rotor torque reaction and the airscrew thrust moment thereby providing a yawing control of the aircraft.

31. An aircraft having a single sustaining rotor, a propulsive airscrew, a power unit and a power transmission from the power unit to the rotor and to the airscrew including a balance gear tending to divide the torque from the power unit in a fixed ratio between the rotor and the airscrew, the latter being offset from the longitudinal axis of the aircraft on the side at which the rotor blades are advancing by an amount such that the rotor torque reaction is substantially balanced by the airscraw thrust moment during normal flight in a straight line, a centrifugal governor coupled to a valve for controlling the admission of fluid under pressure to a relay cylinder operatively connected to the airscrew blades to produce pitch angle change in a sense tending to maintain the airscrew speed constant during normal flight, a pilot's rudder control, a rudder coupled thereto, brakes acting on the airscrew and rotor transmissions respectively and an operative connection between the rudder control and the brakes for operating the latter selectively to produce unbalance of the rotor torque reaction and the airscrew thrust moment to provide a yawing control of the aircraft.

32. An aircraft having a single sustaining rotor, a propulsive airscrew, a power unit and a power transmission from the power unit to the rotor and to the airscrew including a balance gear tending to divide the torque from the power unit in a fixed ratio between the rotor and the airscrew, the latter being offset from the longitudinal axis of the aircraft on the side at which the rotor blades are advancing by an amount such that the rotor torque reaction is substantially balanced by the airscrew thrust moment during normal flight in a straight line, a centrifugal governor coupled to a valve for controlling the admission of fluid under pressure to a relay cylinder operatively connected to the airscrew blades to produce pitch angle change in a sense tending to maintain the airscrew speed constant during normal flight, a pilot's control for altering the equilibrium speed of the centrifugal governor, a pilot's rudder control, a rudder coupled thereto, brakes acting on the airscrew and rotor transmissions respectively, and an operative connection between the rudder control and the brakes for operating the latter selectively to produce unbalance of the rotor torque reaction and the airscrew thrust moment to provide a yawing control of the aircraft.

CYRIL GEORGE PULLIN.